United States Patent
Koz et al.

(10) Patent No.: US 6,188,428 B1
(45) Date of Patent: Feb. 13, 2001

(54) TRANSCODING VIDEO FILE SERVER AND METHODS FOR ITS USE

(75) Inventors: Mark Christopher Koz, Santa Clara; Masato Hata, Sunnyvale, both of CA (US)

(73) Assignee: Mark Koz, Los Gatos, CA (US)

( * ) Notice: Under 35 U.S.C. 154(b), the term of this patent shall be extended for 0 days.

(21) Appl. No.: 08/140,043

(22) PCT Filed: Feb. 11, 1992

(86) PCT No.: PCT/US92/01084

§ 371 Date: Jul. 19, 1994

§ 102(e) Date: Jul. 19, 1994

(87) PCT Pub. No.: WO93/16557

PCT Pub. Date: Aug. 19, 1993

(51) Int. Cl.[7] .................................................. H04N 7/15
(52) U.S. Cl. ............................................. 348/7; 709/219
(58) Field of Search .................................. 348/7, 10, 13, 348/12; 455/3.7; 709/219; H04N 7/15

(56) References Cited

U.S. PATENT DOCUMENTS

| 4,506,387 | 3/1985 | Walter .................................. 455/612 |
| 4,829,372 | 5/1989 | McCalley et al. .................... 358/86 |
| 4,890,320 | 12/1989 | Monslow et al. ...................... 380/10 |
| 4,949,187 | 8/1990 | Cohen .................................. 358/335 |
| 4,955,048 | 9/1990 | Iwamura et al. ...................... 379/53 |
| 4,962,473 | 10/1990 | Crain .................................. 364/900 |
| 4,975,771 | 12/1990 | Kassatly ............................. 358/146 |
| 5,027,400 | 6/1991 | Baji et al. ............................. 380/20 |
| 5,049,993 | * 9/1991 | LeGall et al. ...................... 348/390 |
| 5,056,136 | 10/1991 | Smith .................................. 380/10 |
| 5,062,136 | 10/1991 | Gattis et al. .......................... 380/18 |
| 5,093,718 | 3/1992 | Hoarty et al. ........................ 358/84 |
| 5,130,792 | 7/1992 | Tindell et al. ........................ 358/85 |
| 5,132,992 | 7/1992 | Yurt et al. ............................. 375/122 |
| 5,287,420 | * 2/1994 | Barrett ................................. 348/384 |
| 5,347,304 | * 9/1994 | Moura et al. ......................... 348/17 |

FOREIGN PATENT DOCUMENTS

| 0396062 | 4/1990 | (EP) . |
| 2041707 | 10/1980 | (GB) .............................. G06F/3/153 |
| 9106160 | 5/1991 | (WO) .............................. H04H/1/02 |

OTHER PUBLICATIONS

"A Store–and–Forward Archictecture for Video–on–Demand Service"; A.D. Gelman, H. Kobrinski, L.S. Smoot, S.B. Weinstein; c. 1991; pp. 27.3.1–27.3.5; from the International Conference on Communications 1991.

* cited by examiner

Primary Examiner—Victor R. Kostak
(74) Attorney, Agent, or Firm—Donald E. Schreiber

(57) ABSTRACT

The technical field of the invention generally concerns systems for interactive access to stored video data. In particular, a video file server 20 includes both a random access data storage subsystem 78 and a archive data storage subsystem 82 for storing compressed video data. In response to commands from subscriber system 66, the video file server 20 transmits compressed video data to the subscriber systems 66 over lines 64A–64H, or receives compressed video data therefrom. Commands from the subscriber systems 66 may cause the video file server 20 to store compressed video data received from the subscriber systems 66 in the random access data storage subsystem 78 and/or archive data storage subsystem 82. Compression-decompression cards 42 included in the video file server 20 provide an authoring capability for storing compressed video and/or audio data in the random access data storage subsystem 78 and/or archive data storage subsystem 82, and for converting from one data compression standard to another.

36 Claims, 4 Drawing Sheets

TRANSCODING VIDEO FILE SERVER AND METHODS FOR ITS USE

TECHNICAL FIELD

The present invention relates generally to the technical field of electronic storage and transmission of video data and, more particularly, to the storage of such video data in a compressed digital format, and to transmission of compressed format video data over a comparatively narrow bandwidth communication channel such as that provided by an Integrated Services Digital Network ("ISDN") twisted pair communication channel.

BACKGROUND ART

To deal rationally with the complexity of present communication systems and with the need to make different systems mutually compatible, the International Standards Organization ("ISO") developed a model for specifying such systems. Using this model, called the Open Systems Interconnect ("OSI") model, a communication system can be broken down into a hierarchial structure that permits standards to be defined at each level in the structure. The OSI model provides a hierarchy of seven different layers. that can occur in a communication system. Each layer in the OSI model covers a different function performed by the communication system.

The lowest layer in the OSI model, called the physical layer, specifies the physical structure of interfaces in a particular communication system or network. Thus, a standard for the physical layer of a communication system specifies such things as the number of wires, their electrical characteristics, the characteristics of signals transmitted over the wires, connectors used for joining two sets of wires into a single longer set of wires, etc.

The next higher layer in the OSI model, called the data link layer, specifies how data is transmitted error free through the communication system. Thus, a standard for the second layer in the OSI model specifies how to detect errors in transmissions passing over the physical layer, and how to correct any errors that may occur during transmission.

The next higher layer in the OSI model, called the network layer, specifies the manner in which connections are formed between various places in the communication system for transmitting data between them. The standard for the third layer in the OSI model, therefore, specifies the signals transmitted over the data link layer that cause the communication system to transfer data between two places on the network.

A standard defined by an International Telegraph and Telephone Consultative Committee ("CCITT") for the ISDN communication channel specifies these three lowest levels in the OSI model. Under the CCITT standard, a basic ISDN access consists of two full-duplex 64 kilobits per second ("kbps") digital data channels, called channel B1 and channel B2, plus another full-duplex 16-kbps digital channel, called a D channel. Under the CCITT standard, using time division multiplexing, all three of these digital data channels may be transmitted over a single pair of twisted wires, or over two pairs of twisted wires. ISDN basic access, as specified by CCITT, was originally intended to provide a basic digital data transmission capability suitable for use by individuals such as in their homes or small businesses.

When ISDN basic access was initially specified, each of the B channels was intended to carry either:

1. digital data, such as that from a personal computer or from a computer terminal;
2. Pulse Code Modulation ("PCM") encoded digital voice communication; or
3. a mixture of lower data rate communications including digital data and digitized voice that were each encoded at a fraction of each B channel's full 64-kbps capacity.

Under the ISDN specification, the D channel serves two purposes. First, the D channel carries signaling information that controls the transmission of data over the two B channels. In addition, when the D channel is not carrying signaling information, it may be used to transmit packet-switching or low-speed telemetry. The combined data rate at which digital data may be transmitted over twisted pairs of wires in accordance with the ISDN standard for basic access is 144-kbps, i.e. 128-kbps for the combined B1 and B2 channels plus 16-kbps for the D channel.

In addition to the ISDN basic access specified by CCITT, that organization has also specified a higher performance ISDN communication channel identified as ISDN primary access. An ISDN primary access provides twenty three 64-kbps B channels plus one 16-kbps D channel for a total capacity of approximately 1.5 megabits per second ("mbps"). CCITT envisions that the ISDN primary access can be used for communications between an ISDN local exchange and an ISDN Private Branch Exchange ("PBX").

Because the CCITT standard for the ISDN communication channel specifies the lowest three layers of the OSI model, the ISDN standard provides interfaces, both physical, e.g., the plug in a wall, and logical, e.g., electrical signals passing through the plug. In achieving this result, the ISDN standard specifies several different physical. interfaces, the most widespread of which is called the S interface. The S interface of the ISDN standard specifies the interface between Terminal Equipment ("TE"), e.g., a telephone, and a Network Termination ("NT") of the ISDN communication channel.

In North America, the S interface is the four wires usually found in a home telephone installation. In this interface, two of the four wires transmit data from the Network Termination to the Terminal Equipment, and two wires transmit data back from the TE to the NT. That is, the NT uses one pair of the four wires to transmit the combined B1, B2 and D channels of ISDN basic access to the TE, while the TE simultaneously transmits a different combined B1, B2 and D channels back to the NT on a different pair of the four wires.

While ISDN basic access was originally intended to provide voice and slow speed data communication services such as those identified above, over the years developments in digital signal processing and compression techniques have advanced technology to the extent that compressed video data may now be transmitted using ISDN basic access. These techniques have progressed to such an extent that there now exist several alternative video data compression techniques such as the CCITT H.261 picture phone standard, the Joint Photographic Experts Group ("JPEG") standard, and the Moving Picture Experts Group ("MPEG") standard.

U.S. Pat. No. 5,027,400, that issued Jun. 25, 1991, on an application filed in the names of Toru Baji et al. ("the Baji et al. patent"), discloses a multimedia bidirectional broadcasting system that distributes motion picture data using a broadband ISDN communication channel. In the system depicted in FIG. 3 of the Baji et al. patent, a motion picture program data base is maintained at a broadcasting station for transmission over broadband ISDN communication channels in response to requests received at the broadcasting station from subscriber systems. In the broadcasting station disclosed in the Baji et al. patent, an image encoder compresses a video signal prior to its transmission over the broadband ISDN communication channel to the subscriber system. The subscriber system includes a decoder for decoding the compressed video data and a television monitor for displaying them. Also included in the broadcasting station depicted in FIG. 3 is a cell disassembler that transfers control information received from the subscriber system over the ISDN communication channel to a main control unit of the broadcasting station.

In the broadcasting station depicted in FIGS. 1–3 of the Baji et al. patent, a subscriber system submits a reservation to the broadcasting station to access a program stored there. A group of video buffers, also depicted in FIGS. 1–3, permits the broadcasting system to simultaneously process data bases for a plurality of subscriber systems. A limitation of the broadcasting station disclosed in the Baji et al. patent occurs if the number of data bases available at the broadcasting station is insufficient for the number of subscriber systems requesting them. Under such circumstances, even though the subscriber system can communicate with the broadcasting system through an ISDN communication channel, the broadcasting system notifies the subscriber system attempting to make a reservation of how long it must wait before the data base will become available.

A playback control function, depicted in FIG. 15 of the Baji et al. patent, permits a subscriber system to control a program being transmitted from the broadcasting station, such as fast forwarding it, rewinding it, temporarily stopping it, or displaying it slowly. FIGS. 1–6 of the Baji et al. patent depicts a subscriber system that includes an image encoder for compressing a video signal from a video tape recorder, an optical disk or a real-time video camera prior to transmitting the compressed signal to the broadcasting station. At the broadcasting station, the compressed signal from the subscriber system apparently passes through the cell disassembler to be recorded in a video mail file from which other subscriber systems may retrieve it.

A limitation of the broadcasting system disclosed in the Baji et al. patent is that it lacks the ability to adapt compressed video data to the various different compression techniques such as CCITT H.261, MPEG or JPEG. The illustration of FIGS. 1–6 depicts the video mail file for storing compressed video data transmitted to the broadcasting system from subscriber systems. The text of the Baji et al. patent states that the broadcasting system includes an interface for accessing the video mail file. The illustration of FIGS. 1–6 shows that transmitted video mail file data passes directly from the video mail file to the broadcasting system's cell assembler, thus bypassing the broadcasting system's image encoder. Consequently, data stored in the video mail file of the broadcasting system can be viewed only on a subscriber system capable of decoding video data compressed according to the same standard, e.g., CCITT H.261, MPEG or JPEG, as that employed by the subscriber system in transmitting the compressed video data over the ISDN communication channel to the broadcasting system.

Furthermore, the broadcasting system disclosed in the Baji et al. patent cannot provide real-time communication between two subscriber systems. Using the broadcasting station disclosed in the Baji et al. patent, two subscriber systems can communicate only if one system first stores video data in the broadcasting systems video mail file, after which the other subscriber system must retrieve the stored video data.

Yet another limitation of the broadcasting system disclosed in the Baji et al. patent is that it possesses the capability of transmitting only compressed video data. In addition to various alternative video data compression techniques identified previously, there now also exist a variety of different standards for compressing audio data, such as the CCITT standards G.711 and G.722, that adapt audio data for transmission over an ISDN communication channel.

DISCLOSURE OF INVENTION

An object of the present invention is to provide a video file server that, responsive to requests from a plurality of subscriber systems, can always immediately transmit video or audio data stored thereon.

Another object of the present invention is to provide a system that in real-time can convert video data compressed in accordance with one standard into video data compressed in accordance with a different standard that is incompatible with the first standard.

Another object of the present invention is to provide a file server that is capable of storing and transmitting both video and audio data.

Another objective of the present invention is to provide a video file server capable of providing real-time video communication between subscriber systems.

Another object of the present invention is to provide a video file server also capable of augmenting access to stored video or audio data with real-time video communication between subscriber systems.

Another object of the present invention is to provide a video file server capable of inserting compressed video data for a single stationary image between segments of compressed video data for moving images, and conversely.

Briefly, in a preferred embodiment, a video file server in accordance with the present invention includes a management operation center system for configuring and maintaining the operations and services provided by the video file server. The video file server also includes one or more main units that provides all of the subscriber interface functions, e.g., ISDN Interface ("ISDN I/F"), sending selection menus to subscriber systems, interpreting subscriber requests and executing those requests, up-loading and down-loading of files, etc. Each main unit in the video file server includes a main unit controller for controlling transmission of compressed video data to subscriber systems. Each main unit also includes a random access data storage subsystem for storing compressed video data. Compressed video data stored in the random access data storage subsystem is randomly retrievable.

In addition to the items already described, each main unit controller also includes a plurality of communication subsystems. All of the communication subsystems operate under the control of main unit controller. Each communication subsystem receives control data from a particular one of the subscriber systems requesting that the communication subsystem transmit back to it specific video data stored in the random access data storage subsystem. In response to the control data received from the subscriber system, the communication subsystem transmits control data to the random access data storage subsystem that causes the random access data storage subsystem to retrieve the specific video data and to supply such data to the communication subsystem. Upon receiving the compressed video data from the random access data storage subsystem, the communication subsystem transmits it to the subscriber system.

A video file server in accordance with the present invention may also include compressed video data format conversion subsystems. Each compressed video data format conversion subsystem operates in response to control signals from the main unit controller, and is capable of exchanging compressed video data either with one of the communication subsystems or with the random access data storage subsystem. The compressed video data format conversion subsystem receives video data, either from one of the communication subsystems or from the random access data storage subsystem, that is compressed in accordance with a first compression standard. The compressed video data format conversion subsystem converts the compressed video data into a format specified by a second compression standard that is different from the first compression standard. After the compressed video data format conversion subsystem has converted the video data into the format of the second standard, it transmits that compressed video data to either one of communication subsystems, or to the random access data storage subsystem.

A video file server in accordance with the present invention may also include video data compression subsystems. Each video data compression subsystem operates in response to control signals from the main unit controller, and is capable of exchanging compressed video data either with one of the communication subsystems or with the random access data storage subsystem. The video data compression subsystem receives a video signal, compresses the video signal in accordance with a compression standard specified by the main unit controller, and transmits the compressed video data either to the random access data storage subsystem or to one of the communication subsystems.

A video file server in accordance with the present invention may also include video data decompression subsystems. Each video data decompression subsystem operates in response to control signals from the main unit controller, and is capable of exchanging compressed video data either with one of the communication subsystems or with the random access data storage subsystem. The video data decompression subsystem receives compressed video data either from one of the communication subsystems or from the random access data storage subsystem, decompresses the video data to produce a video signal, and transmits the video signal thus generated.

A video file server in accordance with the present invention may also include audio compression-decompression subsystems. Each audio compression-decompression subsystem operates in response to control signals from the main unit controller, and is capable of exchanging compressed audio data either with one of the communication subsystems or with the random access data storage subsystem. The audio compression-decompression subsystem may receive an audio signal, compress the audio signal in accordance with a compression standard, and transmit the compressed audio data to the random access data storage subsystem. The audio compression-decompression subsystem may also receive compressed audio data from the random access data storage subsystem, decompress the audio data to produce an audio signal, and transmit the audio signal thus obtained.

A video file server in accordance with the present invention may also include an archive data storage subsystem for storing compressed video data from which such data is sequentially retrievable. The archive data storage subsystem operates in response to control data transmitted from the communication subsystems to the archive storage subsystem. Such control data causes the archive data storage subsystem to retrieve compressed video data and to supply such data either to the communication subsystem, for immediate transmission to the subscriber system, or to the random access data storage subsystem.

An advantage of a video file server in accordance with the present invention is that all subscriber systems are able to concurrently request transmission, and all of the communication subsystems, together with the random access data storage subsystem, are capable of concurrently supplying all of the subscriber systems with the same specific video data.

Another advantage of the video file server in accordance with the present invention is that it can provide compressed video data to subscriber systems in a format that differs from the format in which compressed video data is stored in the random access data storage subsystem.

Another advantage of the video file server in accordance with the present invention is that the main unit controller can determine if video data stored in the random access data storage subsystem in accordance with one compression standard is being frequently converted into a second compression standard for transmission to subscriber systems. If particular compressed video data is being converted frequently, the main unit controller can cause that video data to also be stored in the random access data storage subsystem compressed in accordance with the second compression standard so it need not be converted repetitively in responding to future requests from subscriber systems.

Another advantage of the video file server of the present invention is that it can receive compressed video data from one subscriber that is compressed in accordance with a first compression standard, convert that compressed video data into the format specified by a second compression standard, and then transmit the compressed video data in the second format to another subscriber system.

Another advantage of the video file server of the present invention is that it can receive a video signal, convert it into compressed video data, store the compressed video data in the random access data storage subsystem, and then subsequently retrieve the compressed video data for transmission to a subscriber system.

Another advantage of the video file server of the present invention is that it can take compressed video data stored in the random access data storage subsystem, convert it into a video signal, and then transmit the video signal thus produced.

Another advantage of the video file server of the present invention is that it can provide real-time, visually interactive game playing environment for individuals present at subscriber systems. During such game playing, each subscriber systems creates a visual image that is transmitted to other subscriber systems engaged in the game. Thus, for example, in playing such a game two combatants physically separated by a large distance could visually observe each other during combat. Furthermore, the main unit could function as a referee or umpire during such game playing to enforce and/or establish the rules of the game.

These and other features, objects and advantages will be understood or apparent to those of ordinary skill in the art from the following detailed description of the preferred embodiment as illustrated in the various drawing figures.

BEST MODE FOR CARRYING OUT THE INVENTION

Figure 1:
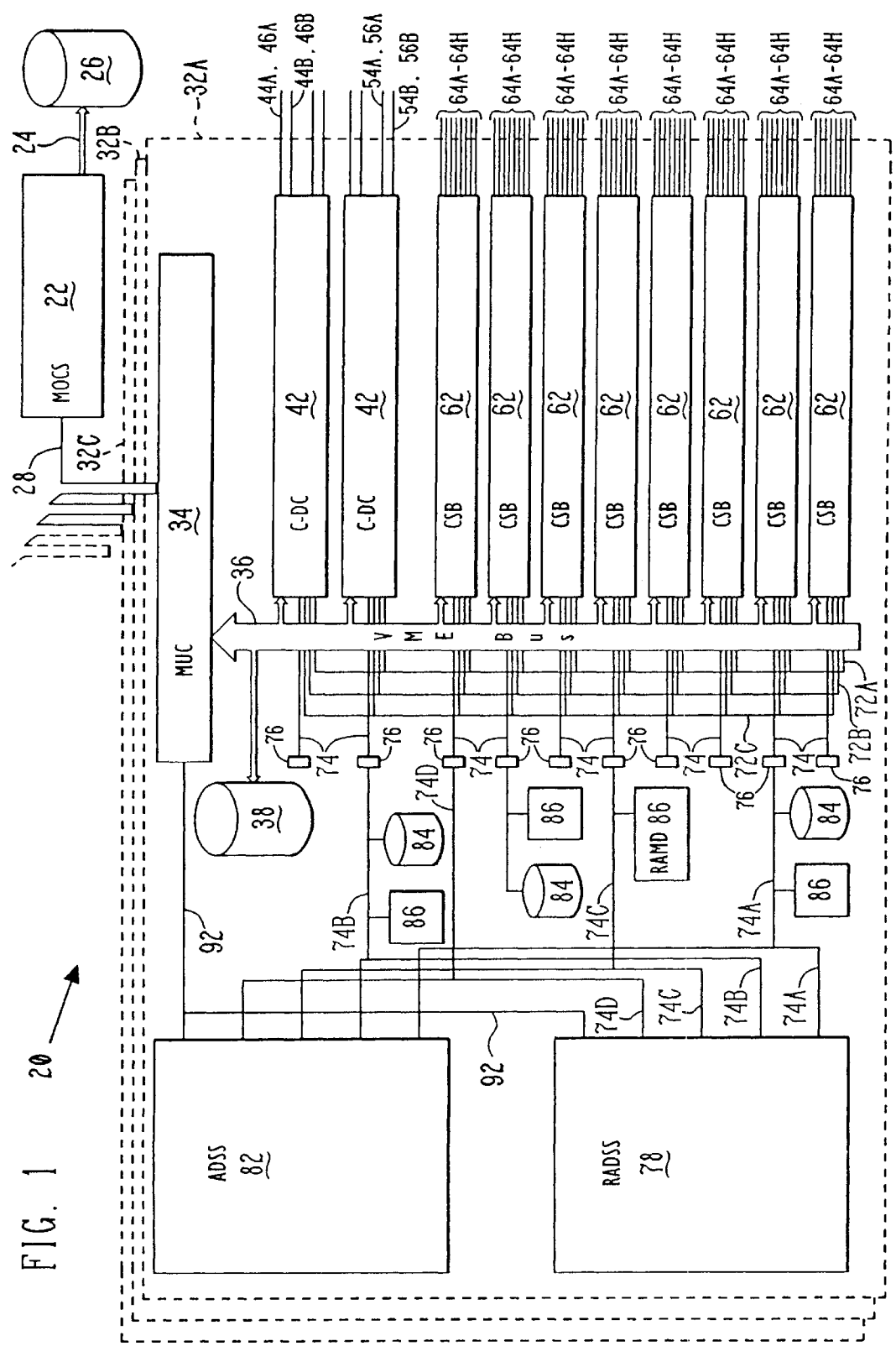
FIG. 1 is a functional block diagram depicting a video file server in accordance with the present invention including a management operation center system; a supervisory main unit controller; a random access data storage subsystem; an archive data storage subsystem; eight communication subsystem boards; two compression-decompression cards; various buses interconnecting the management operation center system, the main unit controller, the random access data storage subsystem, the archive data storage subsystem, the communication subsystem boards, and the compression-decompression cards; communication channels through which the video file server communicates with subscriber systems; and input-output ports to the video file server through which it may receive or transmit either conventional video or audio signals.

FIG. 1 depicts a video file server in accordance with the preferred embodiment of the present invention referred to by the general reference number 20, The video file server 20 includes a management operation center system 22 that is used to configure and maintain the entire operations and services of the video file server 20. The management operation center system 22 is preferably Unix workstation such as a Silicon Graphics Iris computer sold by Silicon Graphics of Mountain View, Calif., or a SPARC computer sold by Sun Microsystems Inc. of Mountain View, Calif. The management operation center system 22 provides a VME bus 24 over which the system 22 communicates with a local file system 26. The local file system 26 stores data and computer programs needed for the overall operation of the video file server 20 including the management operation center system ("MOCS") 22.

The management operation center system 22 also connects by an Ethernet® 28 to a plurality of main units 32A–C. The management operation center system 22 and the main units 32 communicate over the Ethernet® 28 to establish and maintain the overall operation of the video file server 20. While FIG. 1 illustrates the Ethernet® 28 as connecting the management operation center system 22 to only three main units 32A–C, a video file server 20 in accordance with the present invention may include as few as one main unit 32, or as many as 100 main units 32. Regardless of the number of main units 32 included in the video file server 20, all main units 32 communicate with the management operation center system 22 via the Ethernet® 28.

Main Unit 32

Figure 2:
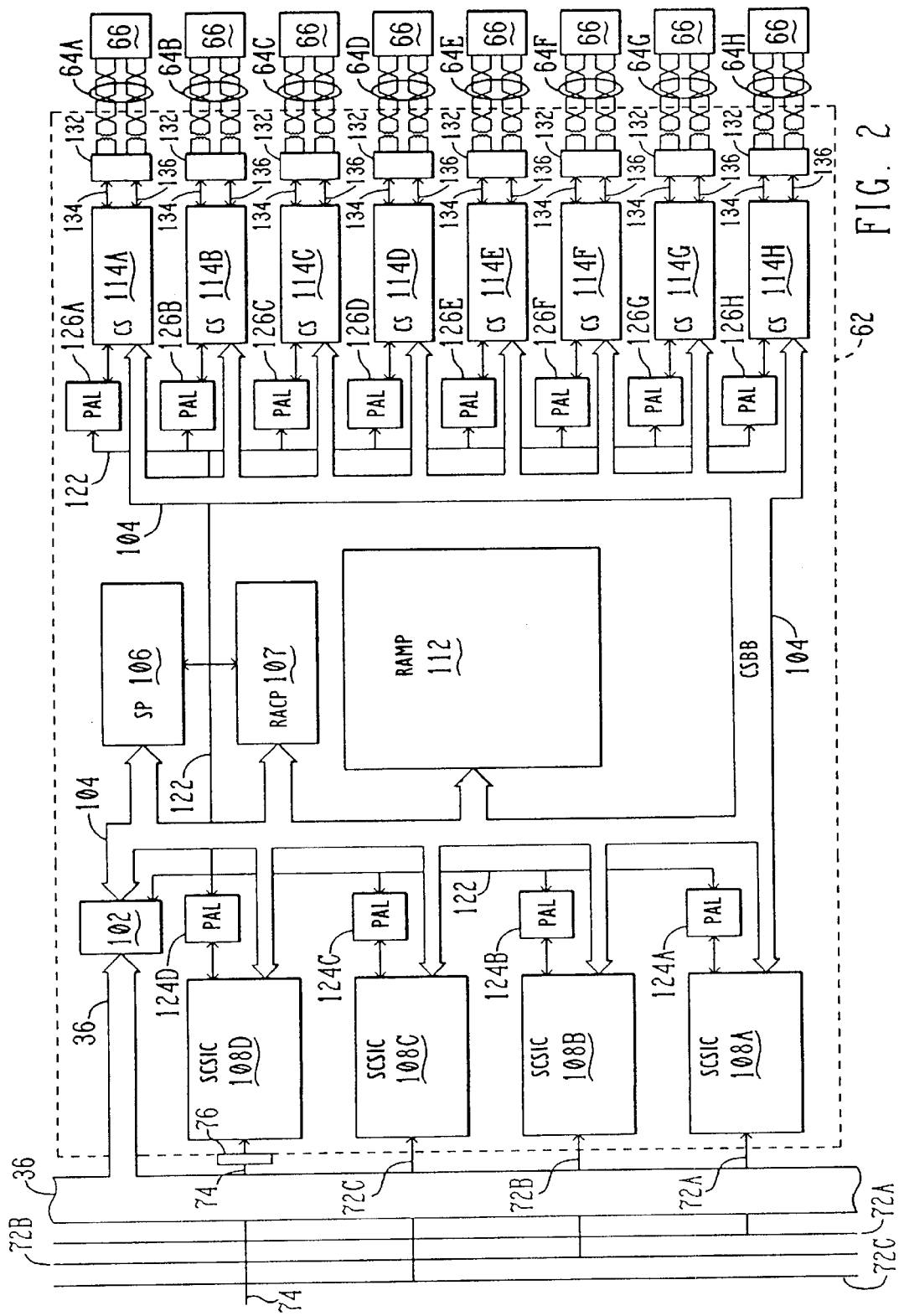
FIG. 2 is a functional block diagram depicting in greater detail one of the communication subsystem boards illustrated in FIG. 1 including its four Small Computer System Interface ("SCSI") units, a VerasModule Eurocard ("VME") bus connecting it to the main unit controller, a control processor, a Random Access Memory ("RAM"), and eight communication subsystems each one of which communicates with a subscriber system through one of various alternative communication channels such as either a Local Area Network ("LAN"), an ISDN primary access, twisted pairs of wires, or, as illustrated in FIG. 2, through an ISDN basic access communication channel.

Each main unit 32 included in the video file server 20 includes a main unit controller ("MUC")34 that is preferably a SPARC model 4-330 computer sold by Sun Microsystems Inc. of Mountain View, Calif. The main unit controller 34 included in each main unit 32 communicates directly with the management operation center system 22 via the Ethernet® 28. Similar to the management operation center system 22, the main unit controller 34 also provides a VME bus 36 over which the main unit controller 34 communicates with a local file system 38. In addition to communicating with the local file system 38 over the VME bus 36, the main unit controller 34 may also communicate with up to two compression-decompression cards ("C-DCs") 42 over the VME bus 36. As better illustrated in FIG. 3, each compression-decompression card 42 includes a pair of stereo input ports 44A and 44B, a pair of stereo output ports 46A and 46B, a pair of video input ports 54A and 54B, and a pair of video output ports 56A and 56B. Referring again to FIG. 1, the main unit controller 34 may also communicate with up to eight communication subsystem boards ("CSBs") 62 over the VME bus 36. In the preferred embodiment of the present invention, each communication subsystem board 62 communicates over one of eight ISDN primary access lines 64A–64H with a subscriber system 66 as illustrated in FIG. 2.

In addition to communicating with the main unit controller 34 over the VME bus 36, both the compression-decompression cards 42 and the communication subsystem boards 62 communicate among themselves over three independent SCSI-2 buses 72A–72C.

In addition to the three independent SCSI-2 buses 72A–72C, each of the compression-decompression cards 42 and each of the communication subsystem boards 62 also includes a SCSI-1 bus 74 provided at a SCSI-1 connector 76. The SCSI-1 bus 74 of each of the compression-decompression cards 42 and each of the communication subsystem boards 62 is used for exchanging data with peripheral devices such as SCSI-1 compatible hard disks, RAM disks, tape drives, etc.

In the embodiment of the video file server 20 depicted in FIG. 1, the SCSI-1 connector 76 of four of the compression-decompression cards 42 and communication subsystem boards 62 respectively connects to one of four independent SCSI-1 buses 74A–74D. The SCSI-1 buses 74A–74D extend the respective SCSI-1 buses 74 of the compression-decompression cards 42 or communication subsystem boards 62 with which they connect to a random access data storage subsystem ("RADSS") 78. The compression-decompression cards 42 and the communication subsystem boards 62 exchange compressed data with the random access data storage subsystem 78 from which such data is randomly retrievable. The random access data storage subsystem 78 preferably includes a Redundant Array of Inexpensive Disks ("RAID") model 6101 manufactured by Amperif, 9232 Eton Avenue, Chatsworth, Calif., having a storage capacity of no less than one gigabyte ($1 \times 10^9$ bytes).

In addition to the random access data storage subsystem 78, both the compression-decompression cards 42 and the communication subsystem boards 62 respectively connected to the SCSI-1 buses 74A–74D also communicate with an archive data storage subsystem ("ADSS") 82 over the four independent SCSI-1 buses 74A–74D. The archive data storage subsystem 82 stores compressed data in a variety of different comparatively low performance storage devices such as laser video disk, optical laser data disk, or 8 mm and/or 4 mm Digital Audio Tape ("DAT") from which compressed video data is sequentially retrievable. The archive data storage subsystem 82 may also exchange compressed data with the random access data storage subsystem 78 over the SCSI-1 buses 74A–74D.

While the preferred embodiment of the present invention depicted in FIG. 1 illustrates four of the compression-decompression cards 42 and the communication subsystem boards 62 as being connected directly to the random access data storage subsystem 78 and the archive data storage subsystem 82 by the SCSI-1 buses 74A–74D, a video file server 20 in accordance with the present invention may include fewer than the four SCSI-1 buses 74A–74D depicted in FIG. 1, or more than the four SCSI-1 buses 74A–74D depicted in FIG. 1 depending upon the total number of compression-decompression cards 42 and/or communication subsystem boards 62 included in the video file server 20, and upon the precise characteristics of the random access data storage subsystem 78 and/or the archive data storage subsystem 82. Furthermore, depending upon the precise configuration chosen for the video file server 20, if it should prove advantageous a local file 84 and/or a RAM disk ("RAMD") 86 may also be connected to each of the compression-decompression cards 42 and/or to each of the communication subsystem boards 62 to provide them with local storage.

In addition to exchanging compressed data with either the compression-decompression cards 42 and/or the communication subsystem boards 62 over the SCSI-1 buses 74A–74D, the random access data storage subsystem 78 and the archive data storage subsystem 82 also communicate with the main unit controller 34 over a fifth SCSI-1 bus 92.

Within each main unit 32, the main unit controller 34 controls the operation of the compression-decompression cards 42 and communication subsystem boards 62 included in the unit 32 by exchanging commands and data with them over the VME bus 36. Furthermore, the main unit controller 34 included in each main unit 32 may exchange data over the SCSI-1 bus 92 directly with either the random access data storage subsystem 78 or the archive data storage subsystem 82. Using the SCSI-1 bus 92, the main unit controller 34 can easily determine what files of compressed video data are available in the random access data storage subsystem 78, or in the archive data storage subsystem 82.

Because of the flexibility in transferring data provided by the SCSI-2 buses 72A–72C and the SCSI-1 buses 74A–74D, commands from the main unit controller 34 may cause compressed data to be transferred between any two units connected to the buses 72A–72C and 74A–74D. Furthermore, those compression-decompression cards 42 and/or communication subsystem boards 62 in the main unit 32 that have their respective SCSI-1 buses 74 connected to the random access data storage subsystem 78 and/or to the archive data storage subsystem 82 exchange compressed data directly with those devices over the SCSI-1 buses 74A–74D in response to commands from the main unit controller 34. Similarly, commands from the main unit controller 34 cause compressed data to be transferred via the SCSI-2 buses 72A–72C between pairs made up of one of the communication subsystem boards 62 and one of the compression-decompression cards 42, between pairs of communication subsystem boards 62, or between the two compression-decompression cards 42. However, compressed data exchange between those compression-decompression cards 42 and/or communication subsystem boards 62 whose SCSI-1 buses 74 do not connect to the random access data storage subsystem 78 or to the archive data storage subsystem 82 must pass through a card 42 or board 62 whose SCSI-1 bus 74 connects to the subsystem 78 and/or subsystem 82. For such data exchanges, the compressed data is exchanged between the compression-decompression cards 42 and/or the communication subsystem boards 62 via the SCSI-2 buses 72A–72C either before or after it passes over one of the SCSI-1 buses 74A–74D between a card 42 or board 62 connected thereto and the random access data storage subsystem 78 and/or the archive data storage subsystem 82.

Each compression-decompression card 42 may receive stereo audio signal(s) through either one or both of its stereo input ports 44A and 44B, compress the audio signal(s) in accordance with a compression standard specified by commands from the main unit controller 34, and store compressed audio data thus obtained into the random access data storage subsystem 78. Alternatively, each compression-decompression card 42 may receive compressed audio data from the random access data storage subsystem 78, decompress the audio data thus received, and transmit stereo audio signal(s) through either one or both of its stereo output ports 46A and 46B.

Similarly, each compression-decompression card 42 may also receive video signals(s) through either one or both of its video input ports 54A and 54B, compress the video signal(s) in accordance with a compression standard specified by commands from the main unit controller 34, and store compressed audio data thus obtained into the random access data storage subsystem 78. Alternatively, each compression-decompression card 42 may receive compressed video data from the random access data storage subsystem 78, decompress the video data thus received, and transmit video signal(s) through either one or both of its video output ports 56A and 56B.

Because the communication subsystem boards 62 receive compressed video data via the SCSI-1 buses 74A–74D directly from the random access data storage subsystem 78, and because the random access data storage subsystem 78 and the SCSI-1 buses 74A–74D can supply data to the communication subsystem boards 62 at a sufficiently high data rate, the video file server 20 is capable of simultaneously supplying all of the subscriber systems 66 with the same specific video data. Thus, in contrast to the system disclosed in the Baji et al. patent, a video file server 20 in accordance with the present invention need never notify a subscriber system 66 that it must wait for some interval of time until specific video data will become available.

Furthermore, each compression-decompression card 42 may receive video data from the SCSI-1 buses 74A–74D that is compressed in accordance with a first compression standard, convert that compressed video data into video data compressed in accordance with a second compression standard that differs from the first compression standard, and then transmit the compressed video data thus obtained over the SCSI-1 buses 74A–74D. Video data to be reformatted from one compression standard to another can come to the compression-decompression card 42 either from one of the communication subsystem boards 62, from the random access data storage subsystem 78, or from the archive data storage subsystem 82. Similarly, video data that has been reformatted from one compression standard to another can be transmitted from the compression-decompression card 42 to any of the communication subsystem boards 62, to the random access data storage subsystem 78, or to the archive data storage subsystem 82.

During operation of the video file server 20, the communication subsystem boards 62 receive control data that requests services from the video file server 20 from the subscriber systems 66 via the ISDN primary access lines 64A–64H. If the control data from a subscriber system 66 requests certain types of service from the video file server 20, the communication subsystem board 62 forwards the request to the main unit controller 34. In response to such a request from a subscriber system 66, the main unit controller 34 may transmit commands back to the communication subsystem board 62 that cause it either to supply compressed video data to, and/or to receive compressed video data from the subscriber system 66 via the ISDN primary access lines 64A–64H. Because of the flexibility afforded by the SCSI-2 buses 72A–72C and the SCSI-1 buses 74A–74D, the communication subsystem boards 62 may obtain compressed video data for transmission to a subscriber system 66 from another communication subsystem board 62, from the random access data storage subsystem 78, from the archive data storage subsystem 82 or from one of the compression-decompression cards 42. Similarly, the communication subsystem boards 62 may deliver compressed video data received from the subscriber system 66 to another communication subsystem board 62, to the random access data storage subsystem 78, to the archive data storage subsystem 82 or to one of the compression-decompression cards 42.

If the main unit controller 34 detects that video data stored in the random access data storage subsystem 78 in one compression standard is being repetitively converted to a second compression standard, it can command the compression-decompression card 42 to store the video data, compressed in accordance with the second compression standard, in the random access data storage subsystem 78. Once video data has been stored in this second compression standard, then the main unit 32 can respond to further requests from subscriber system 66 to receive that video data in the second compression standard without again supplying the video data to the compression-decompression card 42.

The flexibility and facilities provided by the video file server 20 permits a subscriber system 66 that transmits and receives compressed video data in one compression standard to communicate, through the video file server 20, with another subscriber system 66 that transmits and receives compressed video data in a second compression standard that differs from the first compression standard. The video file server 20 permits communication between two such mutually incompatible subscriber system 66 by receiving compressed video data from one subscriber system 66 at one of its communication subsystem boards 62, transmitting that compressed video data to one of the compression-decompression cards 42 where it is reformatted from one compression standard to another, and then passing the translated video data to one of the communication subsystem boards 62 for transmission to a second subscriber system 66.

During operation of the video file server 20, the management operation center system 22 configures the software and hardware of the video file server 20, performs system administration, accounting and billing services, provides for multimedia development and for developing the interface presented to users at subscriber systems 66, and reports statistics on the operation of the video file server 20. Because the interface presented to users at subscriber systems 66 is stored in the local file system 26 of the management operation center system 22, the video file server 20 is easily adapted for use in any language merely by preparing an interface for that language, or by appropriately selecting from among several different interfaces stored in the local file system 26, each such interface having been previously prepared for a particular language.

Communication Subsystem Board 62

Referring now to FIG. 2, the communication subsystem board 62 receives commands from the main unit controller 34 via the VME bus 36 with transceivers 102. The transceivers 102 also connect to a communication subsystem board bus ("CSBB") 104 that interconnects them with a supervisory processor ("SP") 106, a RAM access control processor ("RACP") 107, with four SCSI controllers ("SCSICs") 108A–108D, with a RAM pool ("RAMP") 112, and with eight communication subsystems ("CSs") 114A–114H. The supervisory processor 106 and the RAM access control processor 107 are preferably both a Motorola MC68EC030 microprocessor that is more completely described in a "Motorola Semiconductor Technical Data" sheet MC68EC030/D, copyright Motorola Inc., 1991, that is incorporated herein by reference. The SCSI controllers 108A–108C for the SCSI-2 buses 72A–72C are each preferably either a Fujitsu MB86603 or a Fujitsu MB86602 SCSI protocol controller. The SCSI controller 108D for the SCSI-1 bus 74 is preferably a Fujitsu MB86601 SCSI protocol controller. Both the Fujitsu MB86602 and MB86601 SCSI protocol controllers are more fully described in a "MB86601 & MB86602 SCSI Protocol Controller Product Guide," Second Edition, dated Mar. 11, 1991, Fujitsu VLSI Inc., that is incorporated herein by reference. The RAM pool 112 provides 256M bytes of 30 nanosecond static RAM memory organized as 4 million 64 bit words. operating under the control of the main unit controller 34, a computer program executed by the supervisory processor 106 in each communication subsystem board 62 assigns tasks to be performed by the SCSI controllers 108A–108D and by the communication subsystems 114A–114H. The RAM access control processor 107 manages requests for Direct Memory Access ("DMA") to the RAM pool 112. To effect task assignment and RAM access control, the communication subsystem board 62 includes a communication subsystem board control bus 122 by which the supervisory processor 106 and the RAM access control processor 107 exchange control signals with each other, with the transceivers 102, with the SCSI controllers 108A–108D, and with the communication subsystems 114A–114H.

The communication subsystem board control bus 122 couples control signals among the supervisory processor 106, the RAN access control processor 107, SCSI controller Programmable Array Logic Integrated Circuits ("PALs") 124A–124D, and communication subsystem PALs 126A–126H. The logic circuits in the SCSI controller PALs 124A–124D are programmed to adapt signals exchanged between both the supervisory processor 106 and the RAM access control processor 107, and the SCSI controllers 108A–108D that cause the SCSI controllers 108A–108D to transfer compressed data into or out of the RAM pool 112 over the SCSI-2 buses 72A–72C and the SCSI-1 bus 74. Similarly, the communication subsystem PALs 126A–126H are programmed to adapt signals exchanged between both from the supervisory processor 106 and the RAM access control processor 107, and the communication subsystems 114A–114H that cause the subsystems 114A–114H to transfer compressed data into or out of the RAM pool 112 via the ISDN primary access lines 64A–64H.

The communication subsystem board bus 104 is designed so the computer program executed by the RAM access control processor 107 can dynamically size the bus 104 into multiple narrower buses each of which may be used for exchanging compressed video data between the RAM pool 112 and either the SCSI controllers 108A–108D or the communication subsystems 114A–114H. Thus, the 64 bit wide communication subsystem board bus 104 may be subdivided into two 32 bit wide buses, four 16 bit wide buses, eight 8 bit wide buses, or any combination thereof totaling fewer than 64 bits.

Operating as slaves of the supervisory processor 106, the SCSI controllers 108A–108D and the communication subsystems 114A–114H access the RAM pool 112 using DMA operating in burst mode to transfer blocks of data. This method of operating the SCSI controllers 108A–108D, the communication subsystems 114A–114H, and the RAM pool 112 transfers blocks of data quickly between the RAM pool 112 and the local cache memories respectively located in the SCSI controllers 108A–108D and in the communication subsystems 114A–114H.

Each of the communication subsystems 114A–114H includes a Motorola MC68302 Integrated Multiprotocol Processors ("IMP"). The Motorola MC68302 IMP Integrated Circuit ("IC") is more completely described in the "MC68302 Integrated Multiprotocol Processor User's Manual," Second Edition, MC68302UM/AD Rev 2, copyright Motorola, Inc., 1991 ("MC68302 User's Manual"), that is incorporated herein by reference. In addition to the Motorola MC68302 IMP IC, each of the communication subsystems 114A–114H preferably also includes a Read only Memory ("ROM") containing a program that is executed upon "booting" the video file server 20, 500k bytes of RAM, and an IC for sensing Dual Tone Multi Frequency ("DTMF") signals transmitted by a subscriber system 66 after it and the video file server 20 are exchanging signals through the ISDN primary access lines 64.

An ISDN interface IC 132, located between each communication subsystems 114A–114H and each ISDN primary access lines 64A–64H, exchanges signals over buses 134 and 136 with the Motorola MC68302 IMP IC to adapt the communication subsystems 114A–114H for exchanging compressed video data with subscriber systems 66 over the ISDN primary access lines 64A–64H. The ISDN interface IC 132 used for an ISDN primary access line may be a Rockwell R8069 Line Interface Unit ("LIU"). The Rockwell R8069 LIU is more completely described in a Communication Products Data Book, Order No. 4, published by the Semiconductor Products Division of Rockwell International Corporation, Newport Beach, Calif.

The communication subsystem 114 may be adapted for use with an ISDN basic access line rather than a primary access line by employing a different integrated circuit for the ISDN interface IC 132. Depending upon the particular type of ISDN basic access telephone line over which data is to be transmitted, the ISDN interface IC 132 may be selected from among the Motorola MC145472, MC145474, MC145475, MC14554/7 or MC145564/7 ICs.

Each of the communication subsystems 114A–114H includes an IC for sensing DTMF signals so the subscriber systems 66 may present signals for controlling transmission of compressed video data from the video file server 20 after the subscriber system 66 and the video file server 20 are communicating via one of the ISDN primary access lines 64A–64H. For example, when the video file server 20 transmits compressed video data from the random access data storage subsystem 78 to the subscriber system 66, DTMF signals from the subscriber system 66 may command the video file server 20 to fast forward through a program, rewind the program, pause the program to display a single image, step through the program one image at a time, etc., similar to a conventional VCR.

Compression-Decompression Card 42

Figure 3:
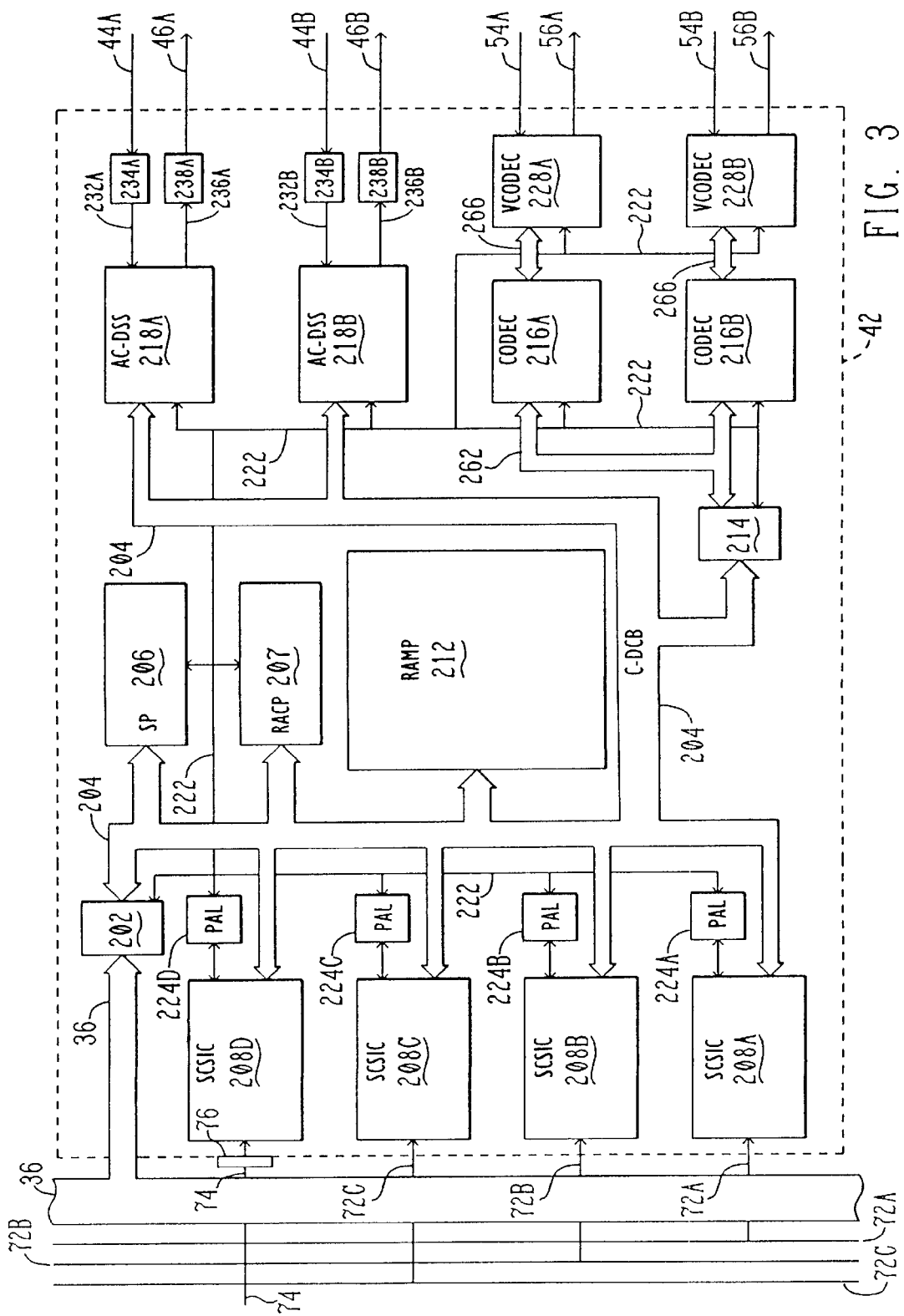
FIG. 3 is a functional block diagram depicting in greater detail one of the compression-decompression cards illustrated in FIG. 1 including its four SCSI units, a VME bus connecting it to the main unit controller, a control processor, RAM, a pair of audio compression-decompression subsystems including ports through which the audio compression-decompression subsystems may either receive or transmit conventional audio signals, and a pair of video compression-decompression subsystems including ports through which the video compression decompression subsystems may either receive or transmit conventional video signals.

Referring now to FIG. 3, similar to the communication subsystem board 62, the compression-decompression card 42 also receives commands from the main unit controller 34 via the VME bus 36 with transceivers 202. Similar to the transceivers 102, the transceivers 202 connect to a compression-decompression card bus ("C-DCB") 204 that interconnects them with a supervisory processor 206, a RAM access control processor ("RACP") 207, with four SCSI controllers ("SCSICs") 208A–208D, with a RAM pool ("RAMP") 212, with transceivers 214 for a pair of Coder-Decoders ("CODECs") 216A–216B, and a pair of audio compression-decompression subsystems ("AC-DSSs") 218A–218B. The structure and operation of the combined transceivers 202, the compression-decompression card bus 204, the supervisory processor 206, RAM access control processor 207, the SCSI controllers 208A–208D, and the RAM pool 212 are identical to that described previously for the corresponding elements of the communication subsystem board 62.

Operating under the control of the main unit controller 34, a computer program executed by the supervisory processor 206 in each compression-decompression card 42 assigns tasks to be performed by the SCSI controllers 208A–208D, the CODECs 216A–216B, and the audio compression-decompression subsystems 218A–218B. The RAM access control processor 207 manages requests for DMA to the RAM pool 112. To effect task assignment and RAM access control, the compression-decompression card 42 includes a compression-decompression card control bus 222 by which the supervisory processor 206 and the RAM access control processor 207 exchange control signals with each other, with the transceivers 202, with the SCSI controllers 208A–208D, with the transceivers 214, with the CODECs 216A–216B, and with the audio compression-decompression subsystems 218A–218B.

The compression-decompression card control bus 222 couples control signals among the control processor 206, the RAM access control processor 207 and SCSI controller PALS 224A–224D. Similar to the SCSI controller PALs 124A–124D, the logic circuits in the SCSI controller PALs 224A–224D are programmed to adapt signals exchanged between both the supervisory processor 206 and the RAM access control processor 207, and the SCSI controllers 208A–208D that cause the SCSI controllers 208A–208D to transfer compressed data into or out of the RAM pool 212 over the SCSI-2 buses 72A–72C and the SCSI-1 bus 74. The compression-decompression card control bus 222 also supplies control signals to two pairs of video decoders-encoders ("VCODECs") 228A–228B.

Each of the audio compression-decompression subsystems 218A and 218B preferably includes a Motorola digital signal processing ICs DSP56000. The Motorola DSP56000 IC is more completely described in a DSP56000 Digital Signal Processor User's Manual A19562-4 published by Motorola Inc. that is incorporated herein by reference. In addition to the DSP56000 IC, each audio compression-decompression subsystems 218A–218B includes a boot ROM and static RAM.

Each of the audio compression-decompression subsystems 218A–218B receives digitized audio data, respectively via a digitized stereo input bus 232A or 232B, from a pair of Analog-to-Digital Converters ("ADCs") 234A or 234B. The ADCs 234A and 234B are preferably a CS4215 dual ADC manufactured by Crystal Semiconductor Corporation of Austin, Tex. The ADCs 234A and 234B respectively receive stereo audio signals from the stereo input port 44A or 44B. Under the control of a computer program executed by each audio compression-decompression subsystem 218, the subsystem 218 compresses digitized audio data received from the ADCs 234 in accordance with a compression standard selected from the numerous different existing audio compression standards, or in accordance with a audio compression technique developed at some future date. The compressed audio data thus produced by each audio compression-decompression subsystem 218 is then transferred over the compression-decompression card bus 204 from the audio compression-decompression subsystem 218 to the RAM pool 212.

If the SCSI-1 bus 74 of a compression-decompression card 42 that has compressed audio data stored in its RAM pool 212 connects to the random access data storage subsystem 78, then that compressed audio data may be transferred through the SCSI controller 208D directly to the random access data storage subsystem 78 via the SCSI-1 bus 74. If the SCSI-1 bus 74 of the compression-decompression card 42 does not connect to the random access data storage subsystem 78, then compressed audio data in the RAM pool 212 must first be transferred via one of the SCSI-2 buses 72A–72C from the RAM pool 212 of the compression-decompression card 42 having the compressed audio data to the RAM pool 212 of another compression-decompression card 42 or of a communication subsystem board 62 whose SCSI-1 bus 74 connects to the random access data storage subsystem 78. After the compressed audio data has been thus transferred from the RAM pool 212 of one compression-decompression card 42 to the RAM pool 212 of another compression-decompression card 42, or of a communication subsystem board 62, it may then be transferred through the SCSI controller 208D to the random access data storage subsystem 78 via one of the SCSI-1 buses 74A–74D.

Compressed audio data stored in the random access data storage subsystem 78 may be converted to stereo audio signals for transmission from the stereo output ports 46A or 46B of the compression-decompression card 42 essentially by reversing the process described above for converting stereo audio signals into stored compressed audio data. Thus, compressed audio data to be transmitted from the stereo output port 46A or 468 is transferred from the random access data storage subsystem 78 to the RAM pool 212 of one of the compression-decompression cards 42 either directly, via one of the SCSI-1 buses 74A–74D, or indirectly via one of the SCSI-1 buses 74A–74D and one of the SCSI-2 buses 72A–72C. The computer program executed by one of the audio compression-decompression subsystems 218A or 218B then fetches the compressed audio data from the RAM pool 212 and decompresses it into digitized stereo audio data. After the computer program executed by the audio compression-decompression subsystems 218A or 218B has thus produced the digitized stereo audio data, that data passes over a digitized stereo output bus 236A or 236B to a pair of Digital-to-Analog converters ("DACs") 238A or 238B. Upon receiving the digitized stereo data from the audio compression-decompression subsystems 218A or 218B, the pair of DACs 238A or 238B converts the digitized stereo data into stereo audio signals for transmission from the stereo output port 46A or 46B of the compression-decompression card 42.

Figure 4:
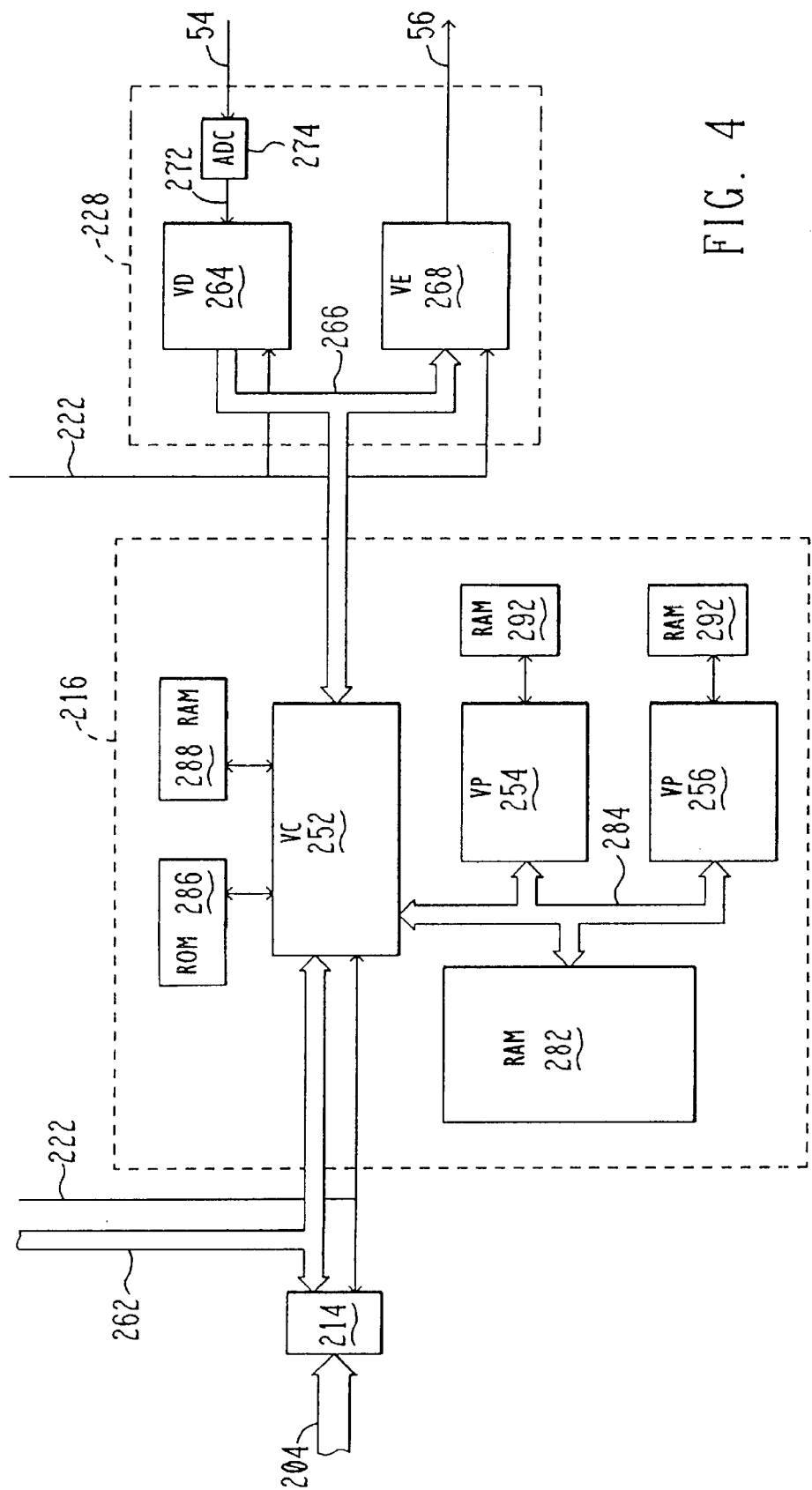
FIG. 4 is a functional block diagram depicting in greater detail one of the two video compression-decompression subsystems illustrated in FIG. 3 that are included in each compression-decompression card.

Analogously to the audio compression-decompression subsystems 218A and 218B, the CODECs 216A and 216B included in each of the compression-decompression cards 42 operate to convert video signals into compressed video data for storage in the random access data storage subsystem 78, and to convert compressed video data stored in the random access data storage subsystem 78 back into video signals. FIG. 4 depicts in greater detail one embodiment of a CODEC 216 suitable for inclusion in the compression-decompression card 42. The particular embodiment of the CODEC 216 depicted in FIG. 4 includes an Integrated Information Technology, Inc. ("IIT") Vision Controller ("IVC") IC 252, and a pair of IIT Vision Processor ("VP") ICs 254 and 256. The VC IC 252 and the VP ICs 254 and 256 are manufactured by Integrated Technology, Inc. of Santa Clara, Calif.

The VC IC 252 included in each of the CODECs 216A and 216B may receive compressed video data from the RAM pool 212 via the compression-decompression card bus 204, the transceivers 214, and a compressed video data bus 262. The VC IC 252 may also transmit compressed video data back to the RAM pool 212 over that same path. The VC IC 252 may also receive uncompressed digitized video data from a video decoder (37 VD") 264 included in each of the video decoders-encoders 228A and 228B over a video data bus 266. The video decoder 264 illustrated in the embodiment depicted in FIG. 4 is preferably a Philips SAA7151A IC, manufactured by Philips Components-Signetics of Sunnyvale, Calif. The VC IC 252 may also transmit video data over the video data bus 266 to a video encoder ("VE") 268 that is also included in each of the video decoders-encoders 228A and 228B. The video encoder 268 illustrated. in the embodiment depicted in FIG. 4 is preferably a Philips SAA7199 IC, also manufactured by Philips Components-Signetics of Sunnyvale, Calif.

The video decoder 264 receives digitized video data via a digitized video input bus 272 from an ADC 274. The ADC 274 receives an analog video signal from the video input port 54. The ADC 274 is preferably a Philips TDA8708 IC, also manufactured by Philips Components-Signetics of Sunnyvale, Calif. The preferred video encoder 268 includes a DAC for producing an analog video signal on the video output port 56. Therefore, the video decoder-encoder 228 depicted in FIG. 4 does not separately illustrate a DAC IC. However, if a different IC were used for the video encoder 268, then a DAC might be required between the output of the video encoder 268 and the video output port 56.

In addition to the VC IC 252 and the VP ICs 254 and 256, the CODEC 216 includes a 2M byte or larger frame buffer dynamic RAM 282 that is accessed via a CODEC bus 284 by the VC IC 252 and the VP ICs 254 and 256. The CODEC 216 also includes a 32k byte boot ROM 286 and a 32k byte static RAM 288 that are accessible only to the VC IC 252. Similarly, each VP IC 254 and 256 accesses a 32k byte static RAM 292.

In the process of converting an analog video signal supplied to the compression-decompression card 42 through one of the video input ports 54A or 54B of either of the two compression-decompression cards 42 into compressed video data for storage in the random access data storage subsystem 78, the video decoder 264 receives the analog video signal from one of the video input ports 54A or 54B and digitizes it into uncompressed video data. The digitized video data thus obtained is then transmitted over the video data bus 266 to the VC IC 252. A computer program executed by the VC IC 252 controls the passage of data through the CODEC 216, and the processing of that data into Huffman encoded compressed video data by the VC IC 252 and by one or the other of the two VP ICs 254 or 256. In processing video data received from the video decoder 264, the VC IC 252 preprocesses that data, supplies the preprocessed video data to either one or the other of the two VP ICs 254 or 256, supervises compression of the video data by the VP IC 254 or 256, performs Huffman coding on the compressed data produced by the VP IC 254 or 256, and transmits the now Huffman encoded compressed video data to the RAM pool 212.

In converting compressed video data from the random access data storage subsystem 78 into an analog video signal to be transmitted from one of the video output ports 56A or 56B of the compression-decompression card 42, the VC IC 252 receives Huffman coded compressed video data from the RAM pool 212, performs Huffman decoding, supplies the Huffman decoded video data to either one or the other of the two VP ICs 254 or 256, supervises decompression of the video data by the VP IC 254 or 256, generates digital pixel video data from the decompressed video data produced by the VP IC 254 or 256, and transmits the video data thus obtained over the video data bus 266 to the video encoder 268. Upon receiving the video data from the VC IC 252 over the video data bus 266, the video encoder 268 converts it into an analog video signal for transmission from the video output port 56A or 56B of this compression-decompression card 42.

Because the CODEC 216 illustrated in FIG. 4 includes two VP ICs 254 and 256, it can use the VC IC 252 and one of the VP ICs 254 or 256 to compress video data received over the video data bus 266 from the video decoder 264 and store the compressed video data into the RAM pool 212 while simultaneously using the VC IC 252 and the other VP IC 256 or 254 to decompress compressed video data received from the RAM pool 212 and transmit it over the video data bus 266 to the video encoder 268. Because the VC IC 252, the VP IC 254, and the VP IC 256 all operate under software control, they may be readily adapted to compress video data in accordance with the H.261, the JPEG or the MPEG standards, or in accordance with a video compression technique developed at some future date. Similarly, the VC IC 252, the VP IC 254, and the VP IC 256 may be readily adapted for decompressing video data that has been compressed in accordance with any of these three standards, or some future technique.

During the operation of each CODEC 216 and each video decoder-encoder 228 for compressing a video signal and/or for decompressing compressed video data, the control processor 206 transmits signals over the compression-decompression card control bus 222 to the CODEC 216 and to the video decoder-encoders 228 for controlling the operation. These control signals may select various features of the video decoder 264 and/or the video encoder 268 such as enabling the processing of either Phase Alternation Line ("PAL") or National Television Systems Committee ("NTSC") video signals, adjusting the contrast, tint, hue, color level, sharpness, coring, etc. of the picture, or other features of the video decoder 264 and/or the video encoder 268. For the CODEC 216, the control signals received over the compression-decompression card control bus 222 from the control processor 206 may select the type of compression and/or decompression, e.g. H.261, MPEG or JPEG, size and location of the image being compressed or decompressed, video timing, etc.

There exist other ICs that may be used for the CODEC 216 in addition to the VC IC 252 and VP ICs 254 and 256 manufactured by IIT. For example, LSI Logic Corporation of Milpitas, California offers a set of ICs that may be used to implement the CODEC 216. Another set of ICs that may be used to implement the CODEC 216 is the X64000 set of ICs sold by GC Technology Corporation of Tokyo, Japan.

As described above, each compression-decompression card 42 provides the video file server 20 with an authoring capability that permits easily storing program material that is available in the form of a conventional audio signal or a conventional video signal into the random access data storage subsystem 78 as compressed audio data or as compressed video data. For example, the video signal for Cable Network News ("CNN") could be supplied to one of the video input ports 54A or 54B of one of the compression-decompression cards 42 included in the video file server 20 and stored in compressed form in the random access data storage subsystem 78 or in the archive data storage subsystem 82.

The compression-decompression card 42 also provides the video file server 20 with a compression standard conversion capability. This capability for converting between two different, incompatible video compression standards may be effected in two different ways. Video compression conversion may be effected digitally by suitably processing the data within a single CODEC 216. Alternatively, video compression conversion may be effected through video signals by coupling the video output port 56 from a video decoder-encoder 228A or 228B to its video input port 54. Analogously, audio compression standard conversion may be performed either digitally in the audio compression-decompression subsystems 218A–218B, or by coupling a stereo output port 46 from a DAC 238 to a stereo input port 44 of a ADC 234.

Industrial Applicability

Operation of the video file server 20 as described above permits supplying all subscriber systems 66 requesting a specific item of video data, e.g., a movie, a music video, or any other program that is stored in the random access data storage subsystem 78, with the requested video data without restricting the access of any subscriber system to the video data; and without restricting the manipulation, e.g., fast forwarding, rewinding, temporarily stopping, or displaying slowly, of the video data by any subscriber system 22.

While the preceding disclosure has been generally made with reference to an ISDN communication channel, the video file server 20 of the present invention may be readily adapted for use with other comparatively narrow bandwidth communication channels other than ISDN communication channels. Such alternative communication channels include mere twisted wire pairs within only a single building or a portion of a building, for example, a school or a Karaoke business establishment.

Because all the functional elements of the adaptive video file server 20 of the present invention are programmable and because the video file server 20 can convert video data compressed in accordance with one compression standard into a different, mutually incompatible standard, it can facilitate a wide variety of different, real-time interactive communication services. Thus, a video file server 20 in accordance with the present invention can first transmit compressed video data from its random access data storage subsystem 78; and then, perhaps in response to a request from the subscriber system 66, augment the stored video data with a real-time video communication to a different subscriber system 66. For example, during a sequence of transmissions to a subscriber system 66 in which the video file server 20 transmits video data relating to travel, in response to a request from the subscriber system 66, the video file server 20 could first establish an ISDN communication channel with a second subscriber system 66 of a travel supplier such as an airline, hotel, etc.; and then the video file server 20 could permit individuals at the two the subscriber systems 66 to conduct a video telephone conference even though both subscriber systems 66 respectively communicate in mutually incompatible video data compression formats.

In an application of the video file server 20 such as that described in the immediately preceding paragraph, because the video data relating to travel may be a stationary image, e.g., an image of a page in an airline schedule, it may be transmitted from the video file server 20 to the subscriber system 66 at a comparatively high resolution, perhaps in accordance with an image compression standard such as JPEG. Subsequently, while the video file server 20 is transmitting compressed video data for moving images to the subscriber system 66, e.g., a video of activities at a resort, or while a video telephone conference is being conducted between the subscriber systems 66 through the video file server 20, video data, compressed in accordance with a different compression standard such as H.261 or MPEG, may be exchanged between the video file server 20 and each of the subscriber systems 66. Thus, the video file server 20 of the present invention is capable of inserting compressed video data for a single stationary image between segments of compressed video data for moving images, and conversely.

Because all the functional elements of the adaptive video file server 20 of the present invention are programmable, it can also be programmed to provide an interactive video game environment in which subscribers playing a game can encounter each other, visually observe each other, and communicate with each other within the game playing environment and rules established by the computer program being executed by the video file server 20. The video file server 20 may provide a game playing environment that is either real-time or not real-time. If the game playing environment is not real time, players may use the video file server 20 to leave messages and/or clues for their opponents, or they may personalize the game playing environment.

For example, the video file server 20 may be used in conducting a "quick draw" contest between two individuals respectively present at subscriber systems 66 located at a distance from each other. In conducting such a "quick draw" contest, each subscriber system 66 transmits compressed video data to the video file server 20 which then retransmits compressed video data onto the other subscriber system 66. In conducting such a "quick draw" contest, the video file server 20 may provide the contestants with a signal indicating when they should begin drawing their respective guns. Moreover, by analyzing the compressed video data received from each of the subscriber system 66, the video file server 20 may determine if either of the participants moves before the video file server sends the signal indicating that they should begin drawing their respective guns, and penalize a participant if they move too soon. Analogously, such a contest could be conducted wherein only a single individual located at a subscriber system 66 competes in a "quick draw" contest with an image of an opponent stored in the random access data storage subsystem 78.

A video file server 20 in accordance with the present invention may be readily used as a historical video archive, analogous to a newspaper's clipping file, that stores news items in the form of videos. That is, video signals for news items could be supplied to the video input ports 54A and 54B of the video file server 20 for storage as compressed video data in the random access data storage subsystem 78 or in the archive data storage subsystem 82. Subsequently, that compressed video data could be retrieved from random access data storage subsystem 78 and/or the archive data storage subsystem 82 during the production of a news program such as that produced by CNN.

While the specific embodiment of the video file server 20 described thus far discloses its use only with ISDN primary access and basic access communication channels, the video file server 20 of the present invention is readily adaptable for use with other types of digital communication channels, even digital communication channels capable of much higher data transfer rates than that provided by ISDN primary access. Thus, it is envisioned that the video file server 20 of the present invention may be readily adapted for communicating over a Very Small Aperture Terminal ("VSAT") communication channel, or over any type of digital communication channel, including both electronic or optical digital communication channels whether dedicated or shared, including shared digital communication channels provided by local area networks such as Ethernet®, token ring, or ArcNet®.

A deficiency in the video file server 20 as described thus far is that a particular item of compressed video data present in only one of the main units 32A, 32B or 32C is accessible to the other main units 32 in the video file server 20 only via the Ethernet® 28 that interconnects the main unit controllers 34 in each of the main units 32. If the video file server 20 requires a higher performance communication capability for compressed video data among the main units 32 than that provided by the Ethernet® 28, then SCSI-1 buses 74 of the compression-decompression cards 42 and/or the communication subsystem boards 62 that are not connected to the SCSI-1 buses 74A–74D within a main unit 32 may be used for interconnecting the main units 32. Interconnecting the compression-decompression cards 42 and/or communication subsystem boards 62 of the main units 32 by means of SCSI-1 buses 74 makes compressed video data stored in the random access data storage subsystem 78 and/or archive data storage subsystem 82 of one of the main units 32 rapidly accessible to any of the compression-decompression cards 42 and/or communication subsystem boards 62 in any of the other main units 32.

Although the present invention has been described in terms of the presently preferred embodiment, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A video file server for storing video data and transmitting compressed video data to a plurality of subscriber systems, said video file server comprising:

a main unit controller for controlling transmission of compressed video data to subscriber systems;

a random access data storage subsystem for storing compressed video data and from which such data is randomly retrievable;

a plurality of communication subsystems, for transmitting compressed video data to the subscriber systems; and compressed video data format conversion subsystem for receiving compressed video data from said random access data storage subsystem that is compressed in accordance with a first compression standard, for converting the received compressed video data from the first compression standard to a second compression standard that differs from the first compression standard, and for transmitting such converted compressed video data compressed in accordance with the second compression standard to at least one of said communication subsystems.

2. The video file server of claim 1 wherein each communication subsystem also receives control data transmitted from a particular one of the subscriber systems to said communication subsystem, such control data received from the subscriber system requesting that said communication subsystem transmit specific video data stored in said random access data storage subsystem back to the subscriber system, responsive to the control data received from the subscriber system said communication subsystem transmitting control data to said random access data storage subsystem for causing said random access data storage subsystem to retrieve the specific video data and to supply such data via said compressed video data format conversion subsystem to said communication subsystem for transmission to the subscriber system.

3. The video file server of claim 2 wherein each communication subsystem is adapted for exchanging data with the subscriber system over a twisted pair of wires, said communication subsystem receiving control data from the subscriber system over the twisted pair of wires and transmitting compressed video data back to the subscriber system over the twisted pair of wires.

4. The video file server of claim 2 wherein each communication subsystem is adapted for exchanging data with the subscriber system over a digital communication channel, said communication subsystem receiving control data from the subscriber system over said digital communication channel and transmitting compressed video data back to the subscriber system over said digital communication channel.

5. The video file server of claim 4 wherein said digital communication channel is an Integrated Services Digital Network ("ISDN") primary access communication channel.

6. The video file server of claim 4 wherein said digital communication channel is an ISDN basic access communication channel.

7. The video file server of claim 1 wherein said communication subsystems are adapted for transmitting compressed video data to subscriber systems over twisted pairs of wires.

8. The video file server of claim 1 wherein each communication subsystem is adapted for exchanging data with the subscriber system over a digital communication channel.

9. The video file server of claim 8 wherein said digital communication channel is an ISDN primary access communication channel.

10. The video file server of claim 8 wherein said digital communication channel is an ISDN basic access communication channel.

11. The video file server of claim 1 further comprising a video data compression subsystem for receiving a video signal, compressing the video signal in accordance with a compression standard, and transmitting the compressed video data to said random access data storage subsystem.

12. The video file server of claim 11 further comprising a video data decompression subsystem for receiving compressed video data from said random access data storage subsystem, decompressing such video data to produce a video signal, and transmitting the video signal thus generated.

13. The video file server of claim 12 further comprising an audio compression and audio data decompression subsystem for receiving an audio signal, compressing the audio signal in accordance with a compression standard, and transmitting the compressed audio data to said random access data storage subsystem, said audio compression and audio data decompression subsystem also receiving compressed audio data from said random access data storage subsystem, decompressing such audio data to produce an audio signal, and transmitting the audio signal thus generated.

14. The video file server of claim 13 further comprising a management operation center system for receiving data from said main unit controller, said main unit controller reporting to said management operation center system transmission of video data by said video file server to subscriber systems, said management operation center system periodically generating accounting charges for transmission of video data to said subscriber systems.

15. The video file server of claim 12 further comprising an archive data storage subsystem for storing compressed video data and from which such data is retrievable, said archive data storage subsystem retrieving compressed video data and supplying such data either to said random access data storage subsystem, or to said communication subsystem for transmission to the subscriber systems.

16. The video file server of claim 15 further comprising a management operation center system for receiving data from said main unit controller, said main unit controller reporting to said management operation center system transmission of video data by said video file server to subscriber systems, said management operation center system periodically generating accounting charges for transmission of video data to said subscriber systems.

17. The video file server of claim 12 further comprising a management operation center system for receiving data from said main unit controller, said main unit controller reporting to said management operation center system transmission of video data by said video file server to subscriber systems, said management operation center system periodically generating accounting charges for transmission of video data to said subscriber systems.

18. The video file server of claim 1 further comprising a video data decompression subsystem for receiving compressed video data from said random access data storage subsystem, decompressing such video data to produce a video signal, and transmitting the video signal thus generated.

19. The video file server of claim 18 further comprising a management operation center system for receiving data from said main unit controller, said main unit controller reporting to said management operation center system transmission of video data by said video file server to subscriber systems, said management operation center system periodically generating accounting charges for transmission of video data to said subscriber systems.

20. The video file server of claim 1 further comprising an archive data storage subsystem for storing compressed video data and from which such data is retrievable, said archive data storage subsystem retrieving compressed video data and supplying such data either to said random access data storage subsystem, or to said communication subsystem for transmission to the subscriber systems.

21. The video file server of claim 20 further comprising a management operation center system for receiving data from said main unit controller, said main unit controller reporting to said management operation center system transmission of video data by said video file server to subscriber systems, said management operation center system periodically generating accounting charges for transmission of video data to said subscriber systems.

22. The video file server of claim 1 further comprising a management operation center system for receiving data from said main unit controller, said main unit controller reporting to said management operation center system transmission of video data by said video file server to subscriber systems, said management operation center system periodically generating accounting charges for transmission of video data to said subscriber systems.

23. A method for storing compressed video data and for transmitting compressed video data to a plurality of subscriber systems, the method comprising the steps of:

storing compressed video data in a random access data storage subsystem from which such data is randomly retrievable, the compressed video data being compressed in accordance with a first compression standard;

retrieving compressed video data from the random access data storage subsystem;

supplying the retrieved compressed video data to a compressed video data format conversion subsystem;

within the compressed video data format conversion subsystem converting the received compressed video data from the first compression standard to a second compression standard that differs from the first compression standard;

transmitting such converted compressed video data from the compressed video data format conversion subsystem to a communication subsystem; and transmitting the converted compressed video data from the communication subsystem to a subscriber system.

24. The method of claim 23 further comprising the step of receiving control data transmitted from a particular one of the subscriber systems to the communication subsystem, such received control data requesting that the communication subsystem transmit specific video data stored in the random access data storage subsystem back to the subscriber system; and wherein the compressed video data retrieved from the random access data storage subsystem is the specific video data requested by the subscriber system.

25. The method of claim 24 further comprising the step of, in addition to transmitting the converted compressed video data from the compressed video data format conversion subsystem to a communication subsystem, also storing the video data compressed in accordance with the second compression standard in the random access data storage subsystem.

26. The method of claim 25 further comprising the steps of:

retrieving compressed video data from an archive data storage subsystem from which such data is sequentially retrievable; and storing the compressed video data retrieved from the archive data storage subsystem in the random access data storage subsystem from which such data is randomly retrievable.

27. The method of claim 26 further comprising the steps of:

a main unit controller recording transmission of compressed video data to subscriber systems and reporting such transmission to a management operation center system; and the management operation center periodically generating accounting charges for transmission of compressed video data to subscriber systems.

28. The method of claim 25 further comprising the steps of:

a main unit controller recording transmission of compressed video data to subscriber systems and reporting such transmission to a management operation center system; and the management operation center periodically generating accounting charges for transmission of compressed video data to subscriber systems.

29. The method of claim 24 further comprising the steps of:

a main unit controller recording transmission of compressed video data to subscriber systems and reporting such transmission to a management operation center system; and the management operation center periodically generating accounting charges for transmission of compressed video data to subscriber systems.

30. The method of claim 23 further comprising the step of, in addition to transmitting the converted compressed video data from the compressed video data format conversion subsystem to a communication subsystem, also storing the video data compressed in accordance with the second compression standard in the random access data storage subsystem.

31. The method of claim 30 further comprising the steps of:

retrieving compressed video data from an archive data storage subsystem from which such data is sequentially retrievable; and storing the compressed video data retrieved from the archive data storage subsystem in the random access data storage subsystem from which such data is randomly retrievable.

32. The method of claim 31 further comprising the steps of:

a main unit controller recording transmission of compressed video data to subscriber systems and reporting such transmission to a management operation center system; and the management operation center periodically generating accounting charges for transmission of compressed video data to subscriber systems.

33. The method of claim 30 further comprising the steps of:

a main unit controller recording transmission of compressed video data to subscriber systems and reporting such transmission to a management operation center system; and the management operation center periodically generating accounting charges for transmission of compressed video data to subscriber systems.

34. The method of claim 23 further comprising the steps of:

retrieving compressed video data from an archive data storage subsystem from which such data is sequentially retrievable; and storing the compressed video data retrieved from the archive data storage subsystem in the random access data storage subsystem from which such data is randomly retrievable.

35. The method of claim 34 further comprising the steps of:

a main unit controller recording transmission of compressed video data to subscriber systems and reporting such transmission to a management operation center system; and the management operation center periodically generating accounting charges for transmission of compressed video data to subscriber systems.

36. The method of claim 23 further comprising the steps of:

a main unit controller recording transmission of compressed video data to subscriber systems and reporting such transmission to a management operation center system; and the management operation center periodically generating accounting charges for transmission of compressed video data to subscriber systems.

\* \* \* \* \*